(12) United States Patent
Christandl et al.

(10) Patent No.: US 9,211,653 B2
(45) Date of Patent: Dec. 15, 2015

(54) METHOD TO PRODUCE A TRANSLUCENT LAYER COMPOSITE CONSTRUCTION ELEMENT WITH INTEGRATED FRONT PLATE

(76) Inventors: Dieter Christandl, Weiz (AT); Josef Christandl, St. Ruprecht/Raab (AT); Robert Hofer, St. Ruprecht/Raab (AT)

( * ) Notice: Subject to any disclaimer, the term of this patent is extended or adjusted under 35 U.S.C. 154(b) by 237 days.

(21) Appl. No.: 13/559,775

(22) Filed: Jul. 27, 2012

(65) Prior Publication Data

US 2014/0030479 A1  Jan. 30, 2014

(30) Foreign Application Priority Data

Aug. 26, 2011 (DE) .......................... 10 2011 111 318

(51) Int. Cl.
| | |
|---|---|
| *B29C 39/10* | (2006.01) |
| *B28B 23/00* | (2006.01) |
| *B28B 19/00* | (2006.01) |
| *E04C 2/54* | (2006.01) |

(52) U.S. Cl.
CPC ........... *B28B 23/0037* (2013.01); *B28B 19/003* (2013.01); *B28B 19/0015* (2013.01); *B29C 39/10* (2013.01); *E04C 2/54* (2013.01); *Y10T 29/4998* (2015.01); *Y10T 428/24322* (2015.01); *Y10T 428/24612* (2015.01)

(58) Field of Classification Search
None
See application file for complete search history.

(56) References Cited

U.S. PATENT DOCUMENTS

| 8,091,303 | B2 * | 1/2012 | Losonczi ........................ 52/307 |
| 8,091,315 | B2 * | 1/2012 | Losonczi ........................ 52/596 |
| 2011/0244181 | A1 * | 10/2011 | Cangiano et al. ............. 428/138 |
| 2013/0084424 | A1 * | 4/2013 | Cangiano et al. ............. 428/138 |

FOREIGN PATENT DOCUMENTS

| EP | 1 970 179 | 9/2008 |
| EP | 1970179 | * 9/2008 |
| EP | 2 177 332 | 4/2010 |
| JP | 2006-220981 | 8/2006 |

OTHER PUBLICATIONS

English Translation of EP 1970179.*

* cited by examiner

*Primary Examiner* — Edmund Lee
(74) *Attorney, Agent, or Firm* — Faegre Baker Daniels LLP

(57) ABSTRACT

Method for producing a heat insulating, light conducting multilayer composite construction element for facades of building structures and the like, in which the multilayer composite construction element consists of at least one layer of a curable casting compound and at least one heat insulating layer of insulating material, and all layers are penetrated by light conducting elements, whereby a.) in a first process step the light conducting elements are fixed in an insulating body forming the heat insulating layer, b.) in a second step the light conducting elements fixed in the insulating body are inserted in a formwork space of a formwork formed by formwork panels and c.) in a third step the formwork space is filled with a curable casting compound, forming at least one support layer, whereby b1.) the formwork panels used in the second step are designed as permanent ("lost") formwork elements consisting of facade panels provided with drill holes or recesses, in which the front sides of the light conducting elements are received at least partially.

17 Claims, 4 Drawing Sheets

Figure 2:
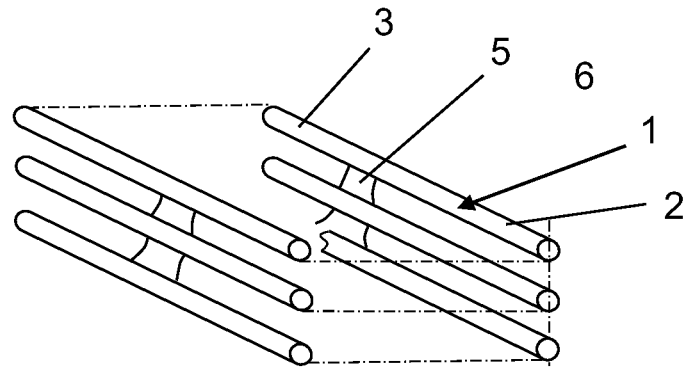

METHOD TO PRODUCE A TRANSLUCENT LAYER COMPOSITE CONSTRUCTION ELEMENT WITH INTEGRATED FRONT PLATE

The invention concerns a method and a device for producing a translucent multilayer composite construction element with integrated facade panel and a multilayer composite construction element with integrated facade panel manufactured according to said method.

The method and device described above for producing such a translucent multilayer composite construction element has been disclosed with the subject matter of the EP 1 970 179 A2. We make reference to the full content of disclosure mentioned there. The disclosure of the present invention comprises said content of disclosure.

In the publication mentioned above, the translucent composite construction element is produced in such a way that first of all the rigid light conductor rods are inserted in drill holes of an insulating body so that their ends protrude from the opposite surfaces of the insulating plate.

Then, the base body produced in this way is immersed in a formwork which has already a curable casting compound arranged in its floorspace, which is used as bearing surface and designed to be mechanically resilient.

In the next process step, the remaining part of the curable casting compound is sprayed on the top surface of the insulating plate, resulting in a multilayer composite structure which is sealed on both sides with a support layer. When the multilayer composite structure thus filled on both sides with support layers is removed from the formwork, it is required as a next process step to grind the opposite front sides of the multilayer composite structure in order to make them flush with the level of the cured face layer so that the ends of the light conductor rods are exposed.

The production process described above is relatively extensive because first the light conductor rods have to be manually inserted in drill holes of an insulating body, and then it is necessary to use a formwork in which the two opposite face layers are infused or sprayed on the insulating body.

The following process of grinding the two opposite front sides considerably increases the efforts in producing such a composite body.

A disadvantage of the method mentioned above is not only the fact that it involves a relatively extensive production process but also that it is impossible to combine the multilayer composite structure with a facade panel.

Although it would be possible to place a facade panel with drill holes directly in front of the face layer with the light conductor rods anchored on the face. However, this has the disadvantage that it would be relatively difficult to bring the drill holes in the face panel in alignment with the front sides of the light conductor rods anchored in the face layer. Moreover, it is difficult to subsequently connect a facade panel with the face layer by means of bonding or the like.

Furthermore, because of the thickness of the facade panel of, for example, between 2 and 5 mm, it is of disadvantage that the drill holes in the prefixed facade panel are not filled with light conductor rods but are merely prefixed as hollow drill holes before the front sides of the light conductor rods. This results in undesired light loss because the light has to penetrate the hollow drill holes in the facade panels, sustaining scattering loss in the process. Moreover, such hollow drill holes in facade panels are disadvantageous because they can get clogged with dirt and debris which, because of the accumulating dirt in the drill holes, would result in complete coverage of the light-emitting front sides of the light conductor rods when the multilayer facade elements are used for an extended period of time.

Therefore, the invention is based on the objective of further developing a method and a device for producing a translucent multilayer composite construction element in such a way that at least one facade panel can be integrated directly in the multilayer composite construction element and that the overall manufacturing process can be made easier and more cost-effective.

The solution to the problem is characterized by the technical teaching of claim 1 of the invention.

A basic characteristic of the invention is that at least on one side of the invention-based multilayer composite construction element a facade panel is integrated in such a way that it forms a permanent ("lost") formwork and remains as a formwork panel at the multilayer composite construction element, thus achieving a double benefit.

On the one hand, the formwork panel used in the second step is according to the invention directly designed as a facade panel and remains at the construction element after removing the casting or injection mold. This has the advantage, that the facade plate provided with drill holes for engaging the front sides of the light conducting elements already contains the light conducting elements and fills the drill holes in the facade panel, thus eliminating the hollow drill holes that were previously considered to be of disadvantage. As a result, the front sides of the light conducting elements can be flush integrated in the drill holes or recessed of the formwork panel, so that they become flush with the outer side of the formwork panel.

The fact that the formwork panel is designed as a facade panel has the advantage that a convenient, adhering bond can be formed between the facade panel designed as a formwork panel and the integrally molded face layer or insulating layer.

To improve the adhesive bond, provision can be made to integrally mold additional anchoring elements on the rear side of the formwork panel (the later facade panel), which engage in the face or insulation layer which are to be molded to or injected in the face or insulation layer.

For matters of simplification, it is assumed in the following description that the invention-based multilayer composite construction element is covered with facade panels designed as permanent formwork on the sides opposite of each other (visible side and rear side). Each of the facade panels are integrated at the multilayer composite construction element in the manner described above.

However, in a simplified embodiment the facade panel forming the rear side of the multilayer composite construction element can consist of a different material than the multilayer composite construction element forming the visible side of the facade panel. For example, the panel forming the rear side can consist of wood-based material, cost-effective plastic material, paper or cardboard, whereby it is only important that the formwork panel forming the rear side of the composite construction element (just like the facade panel arranged at the front side) is able to withstand the formwork pressure of the casting compound flowing into the formwork.

In a further development of the invention the rear formwork panel can be removed when the casting compound at the rear side of the multilayer composite construction element is cured. As a result, the invention-based multilayer composite construction element is integrated only with a facade panel on its visible side while on its rear side the formwork panel has been removed.

Therefore, the invention claims a multilayer composite construction element which comprises at least at its visible side a facade panel comprising drill holes, and the light-emitting ends of the light conductor rods or light conducting elements are received in the drill holes.

The term "light conducting elements" used in the claims includes all rigid light conducting elements, for example, light conductor rods with round, angular, oval or square cross section, as well as rod-shaped, disc-shaped or any other light conducting elements, which are preferably manufactured from light conducting plastic material.

For matters of simplification, the following description will provide a detailed description of the special embodiment of a light conducting element, namely the design of a light conductor rod even though the invention is not restricted to this use.

The invention provides also different possibilities of arranging light conductor rods, whereby in a first embodiment the light conductor rods are injected in an injection molding process at a grid-bar mat, whereby the grid-bar mat consists also of light conducting plastic material. Thus the longitudinal and transversal rods of the light conducting mat are made from light conducting material, and at the intersection points of the longitudinal and transversal rods the vertically protruding light conductor rods are injected.

With their upper ends the light conductor rods project beyond the grid bar upwards and with their lower ends downwards, resulting in a three-dimensional structure.

However, in a simplified embodiment the light conductor rods can be designed also as a bundle, i.e. Thy have no fixation or bond to each other, but they are only fixed when they are molded in an insulating body where they receive their desired spatial arrangement.

In a third embodiment, different fixation elements are used to keep the individual light conductor rods at a distance from one another (temporarily before performing the molding or injection process), for example, by means of textile fabric, through elastomer mass and the like, whereby the spatial fixation of the light conductor rods thus achieved is used only as temporary fixation of the light conductor rods and only to the point when the light conductor rods provided with fixation are inserted as a bundle in the first formwork and are injected in the central area with an insulation substance.

By means of this process an approximately centred insulating body is produced, which preferably consists of a heat insulating material (for example, polyurethane foam). As soon as the light conductor rods are temporarily fixed in the cured insulating body no further structural stability is required for the light conductor rods. Structural stability of the light conductor rods is now provided by the insulating body consisting of curable heat insulation material.

Preferably, the material of the casting compound comprising the face layer or support layer consists of a curable concrete layer, which preferably consists of self-compactin concrete (SCC).

Instead of such SCC materials, it is also possible to use other curable materials in, for example, pourable and curable wood composites, plastic materials, synthetic mineral aggregates, mineral casts, clay, limestone and any other curable materials.

It is important that the casting compound forming the face layer has relatively high bearing capacity, so that it is possible to integrate as a facade panel (for example, in the form of a brick) a multilayer composite construction element produced with said casting compound in a building structure, and the mutual bond between the components is produced with concrete or curable plastic materials or mechanical link anchors.

The casting compound, which preferably consists of pourable or curable concrete differs from the curable insulation material through higher bearing capacity but lower heat insulation capacity.

However, the invention is not restricted to a three-layer core of the multilayer composite construction element.

In the first embodiment described the core consists of a layer of the mechanically highly resilient casting compound positioned directly behind the visible facade panel, followed by an approximately centred insulating body consisting of highly heat insulating insulation material, which insulating body has on its rear side a further layer of a second highly resilient casting compound. The rear side of this layer is covered with a further facade panel or with a different covering plate or formwork panel, which—according to the description above—can also be removed after the casting compound on the rear side has been cast.

Furthermore, the invention provides an embodiment which does not require the highly resilient casting compound arranged directly behind the visible facade panel closest to the visible side; instead the rear side of the facade panel is directly adjacent to and anchored at the front side of the insulating body.

Furthermore, provision can be made to arrange at the top and bottom additional layers of a highly resilient casting compound or a heat insulating insulation material which is arranged in correspondence with one or several of the embodiments described above.

At any rate it is important for the invention that the facade panel comprises a heat insulating layer, whereas—as previously described—the highly resilient casting compound arranged closest to the visible facade panel can be eliminated.

It is also possible to eliminate the casting compound arranged at the rear side of the insulating body, and the formwork panel of facade panel located on the rear side can be directly adjacent to and anchored at the insulating body.

It is preferred to use as facade panel metal plates consisting of light metal alloy. However, it is also possible to use different types of plates, for example, plastic panels or plastic, metal or wood panels covered with a film layer.

It is important that the facade panel arranged at the visible side also forms the visible side of the building, thus forming a decorative exterior.

To achieve this purpose, provision can be made to cover the aluminum panel also with decorative films, a print, or to use composite panels consisting of a plastic-metal compound.

Performing this method has the advantage that it is not required to clean the visible side of the visible facade panel because it is placed as a permanent formwork with a clean outside (the future visible side) into the formwork where it is not exposed to any soiling. Merely on the rear side of the visible facade panel the casting compound or alternatively the insulating body is integrally molded or injected or anchored, which does not affect the front side of the facade panel.

Therefore, it is not necessary to extensively trim the visible side of the facade panel and uncover the light conduction rods which engage flush in the drill holes or recesses arranged there.

The subject matter of the present invention does not only involve the subject matter of the individual claims but also a combination of the individual claims.

All statements and characteristics disclosed in the documents, including the abstract, particularly the spatial design presented in the drawings, are claimed as
important factors of the invention, provided they are new individually or in combination when compared to prior art.

Subsequently, the invention is described in more detail by means of drawings presenting several methods of implementation. The drawings and their descriptions provide further invention-relevant characteristics and advantages of the invention.

Figure 1:
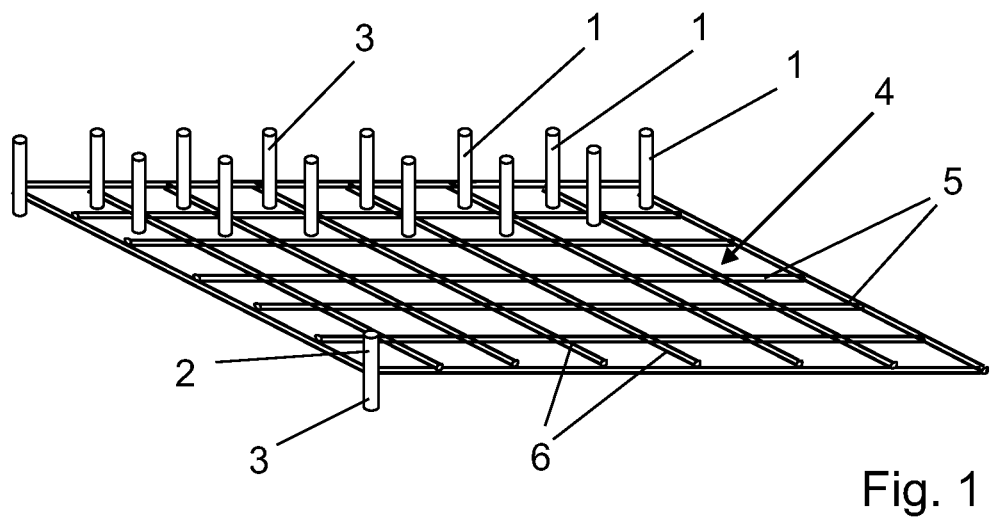
Figure 3:
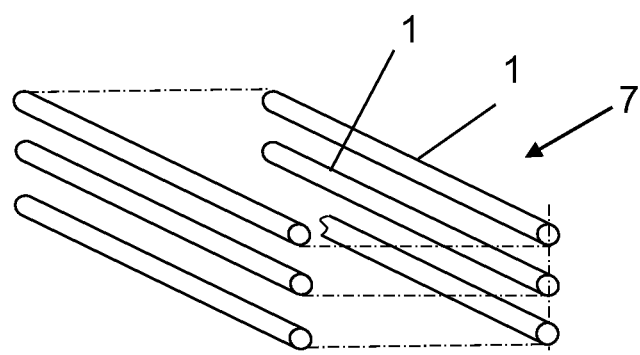
Figure 4:
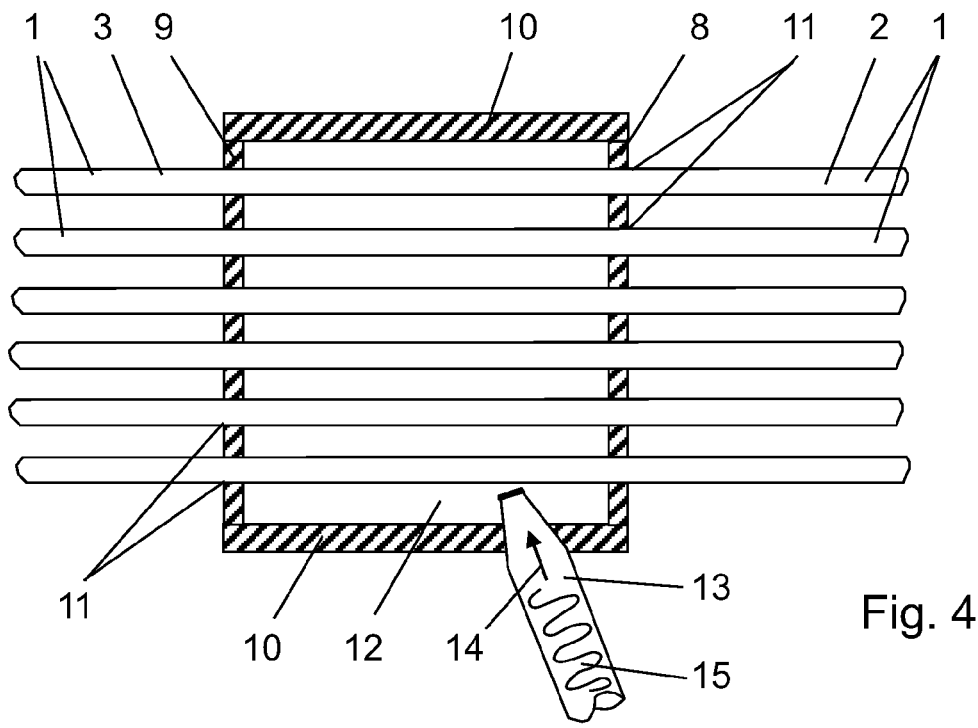
Figure 5:
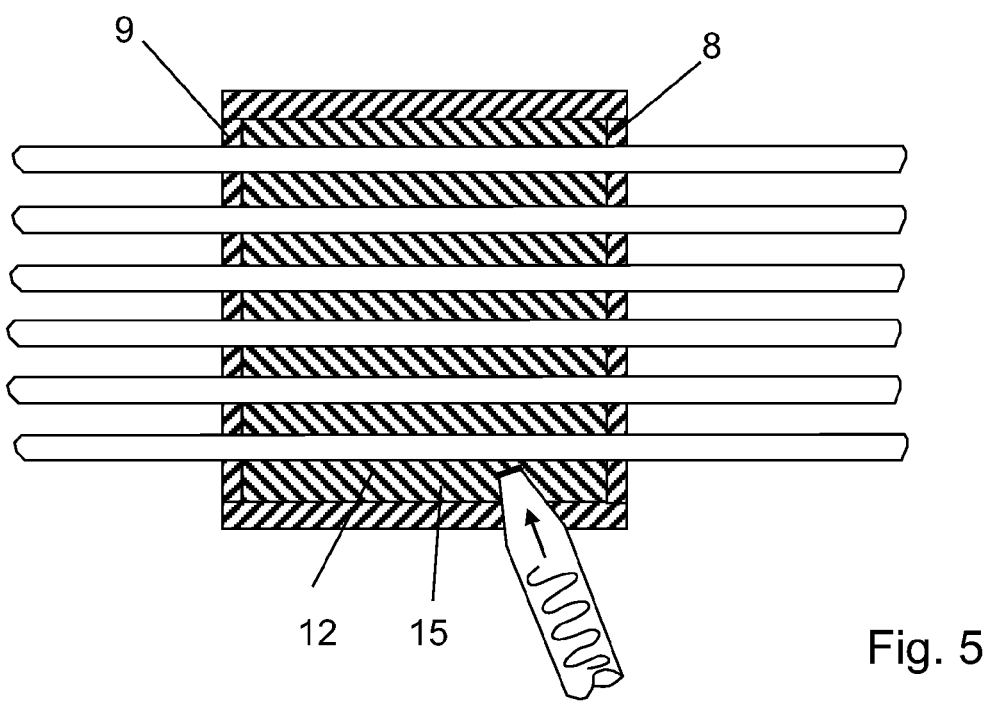
Figure 6:
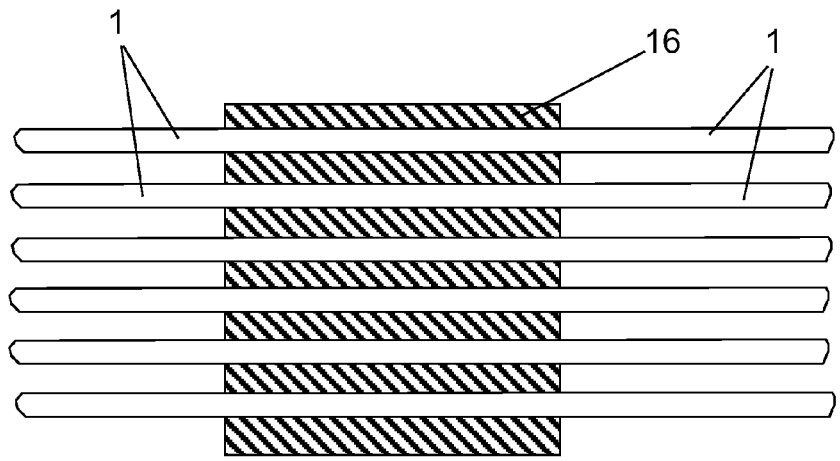
Figure 7:
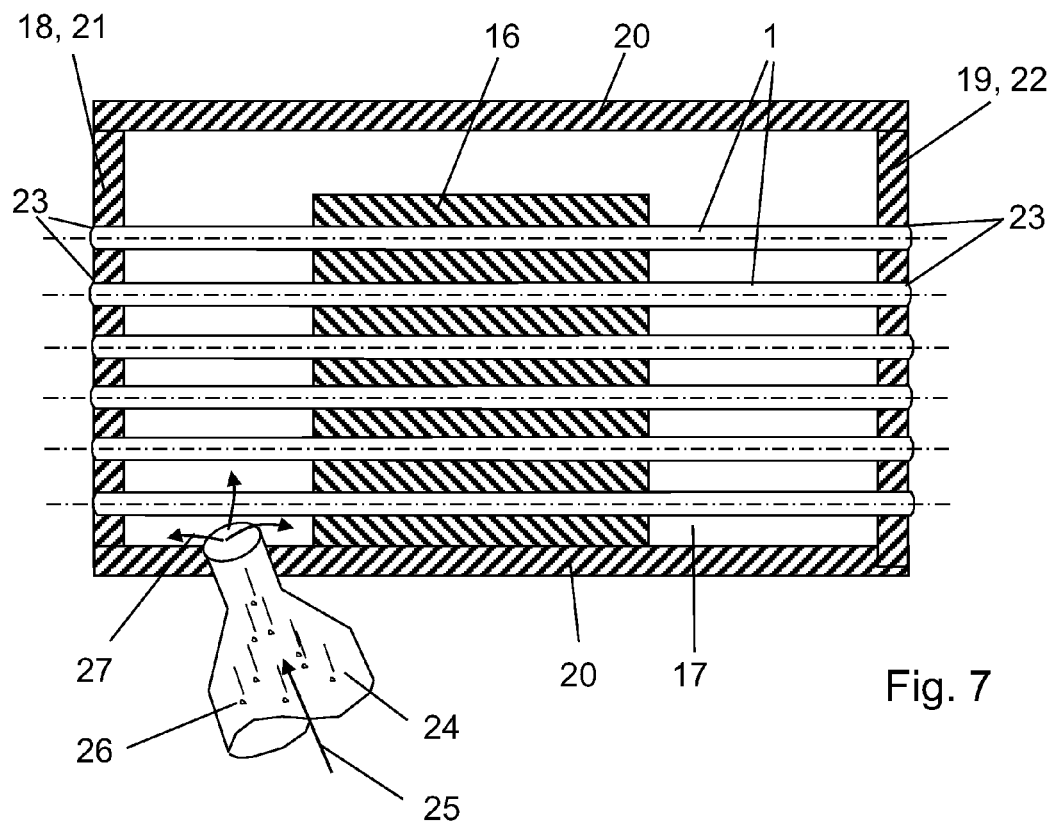
Figure 8:
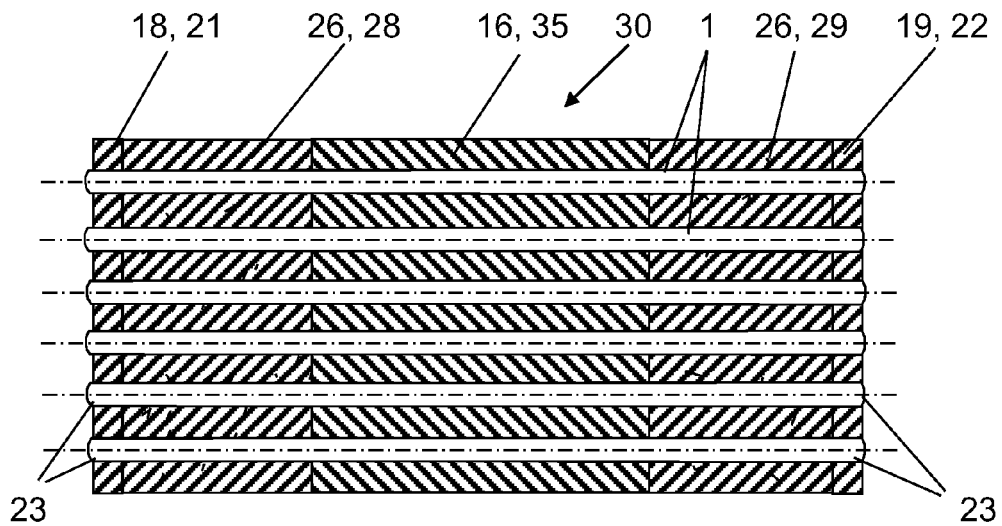
Figure 9:
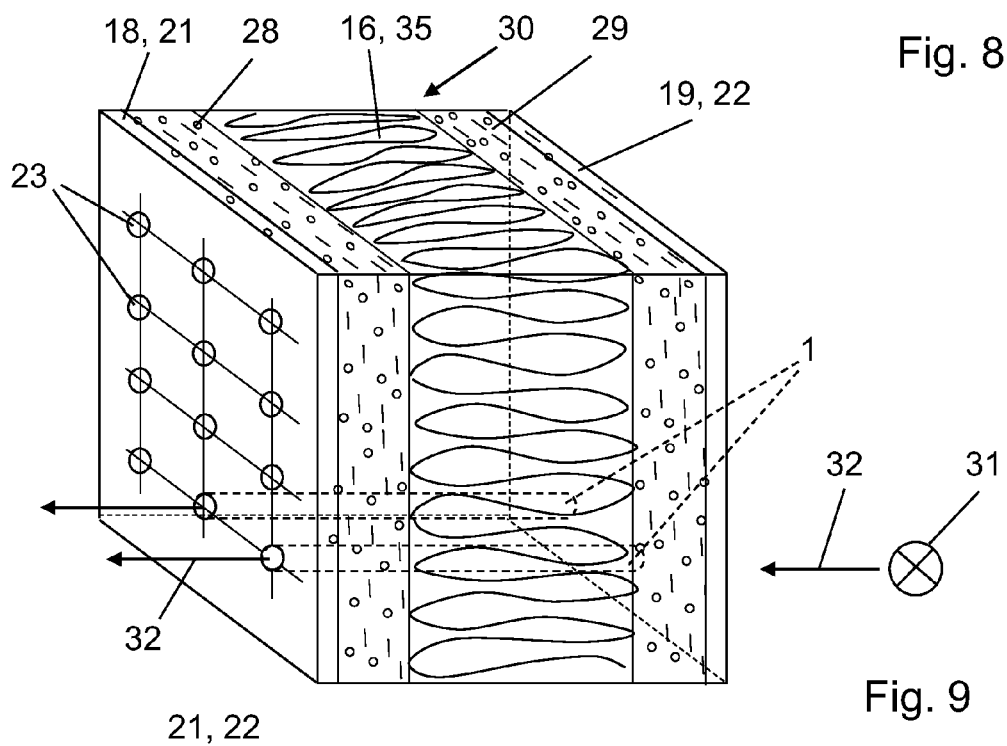

It is shown:

FIG. 1: a perspective view of a light conductor mat,

FIG. 2: a diagram of an enlarged section of the light conductor rods shown in FIG. 1 turned by 90°, FIG. 3: a bundle of light conductor rods which are not fixed in their mutual distance, FIG. 4: the first process step for producing the inside insulating body prior to injecting the insulating material into the formwork space, FIG. 5: the same diagram that is shown in FIG. 4 but after injecting the insulating material, FIG. 6: the diagram according to FIG. 5 after removing the formwork panels arranged at the ends, FIG. 7: the body resulting from FIG. 6 when it is inserted into a second formwork space and when facade panels at the ends are arranged as formwork panels at the ends prior to injecting a casting compound, FIG. 8: the completed multilayer composite structure resulting from FIG. 7, FIG. 9: a perspective side view of the composite structure shown in FIG. 8

Figure 10:
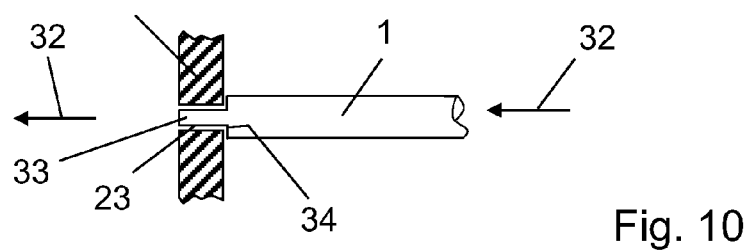

FIG. 10: a diagram of the engagement at the ends of the light conductor rods in the drill holes of the visible facade panel.

The diagram in FIGS. 1 and 2 shows that light conductor rods 1 can be provided in any configuration, composition and with any cross section, maintaining their distance by means of attached fixing elements.

In the embodiment shown, each light conductor rod consists of a light conducting plastic material, for example, polycarbon or the like. Each light conductor rod 1 has an upper end 2 and a lower end 3 and can have any profile.

The embodiment according to FIGS. 1 and 2 shows that the light conductor rods 1 are injected at the intersection points of a grid mat 4 which consists of crossing longitudinal and transversal rods 5, 6 which are connected to each other.

The longitudinal and transversal rods 5, 6 mentioned also consist of light conducting plastic material, resulting in very favorable light distribution on all light conductor rods 1 arranged at the grid mat 4, because the light conducting longitudinal and transversal rods 5, 6 provide a favorable and even light distribution across the surface of the grid mat 4. The light conductor rods can also be injected at the upper and lower surface of a plastic film or mat.

FIG. 3 shows a different embodiment, in which the light conductor rods 1 having any configuration, cross-sectional shape—which can be provided also as disc or rectangular shaped elements—can be available in the form of a bundle 7, whereas said bundle 7 keeps the light conductor rods 1 in their predetermined configuration through distance-keeping means (not shown).

As shown in FIG. 4, an important advantage of the invention involves the fact that the individual light conductor rods 1 can be allocated without using fixation means for keeping the light conductor rods at their respective distances.

In order to connect the light conductor rods 1, which do not comprise any fixation means, in a specific distance-keeping configuration, a first formwork has been provided, which consists of two opposite formwork panels 8, 9, whereas the formwork panels 8, 9 comprise a plurality of drill holes 11, which are aligned with each other and in which the light conductor rods 1 are inserted.

According to the type and arrangement of the drill holes 11, the light conductor rods 1 are inserted manually or automatically in the drill holes 11 of the formwork panels 8, 9, until they have the shape shown in FIG. 4 means that the front end 2 protrudes on the one side of the formwork space 12, and the rear end 3 protrudes on the other side.

Furthermore, the formwork space is closed by means of covering plates 10 arranged on the upper and lower side of the formwork space.

According to FIG. 4, a fast-curing insulation material 15, for example, PUR foam, is injected by means of a suitable filling device into the formwork space in the direction of the arrow 14. It cures in the manner shown in FIG. 5 and encloses the light conductor rods 1 on all sides. As a result, said rods are fixed in an especially efficient manner, which is shown in FIG. 6.

Removing the formwork panels 9 and the panels 10 arranged at the top and at the bottom results in the insulating body 16 shown in FIG. 6, in which the light conductor rods 1 are surrounded secure against shifting and enclosed on all sides by the insulating material 15.

As a result, all light conductor rods 1 are fixed, and no further distance-keeping fixation elements or the like are required, in order to insert the body produced according to FIG. 6 into a further formwork according to FIG. 7.

To produce the formwork according to FIG. 7, it is important to attach first to the ends of the light conductor rods 1 formwork panels 18, 19, namely in such a way that the ends of the light conductor rods 1 engage in the drill holes 23 of the formwork panels 18, 19. As a result, the formwork panels 18, 19 are kept at a distance by means of the light conductor rods, resulting in a stable formwork space without having to use further fixation elements to keep the formwork panels in position.

According to the invention, provision has been made to design at least the visible formwork panel 18 as a facade panel 21, thus forming a permanent formwork for the formwork space.

Furthermore, the formwork space 17 is formed by the covering plates 20 arranged at the top and bottom, which results in an overall closed formwork space 17.

When during the process of filling a cured casting compound 26 in the direction of the arrow 25 by means of a suitable filling device 24 the relatively heavy casting compound flows into the formwork space 17, the light conductor rods 1 are perfectly fixed against the generated displacement pressure, because each of their ends is received in the drill holes 23 of the formwork panels 18, 19 and cannot be shifted or bent.

In a first embodiment of the invention, also the rear formwork panel 19 of the multilayer composite construction element produced according to FIG. 7 is designed as a rear facade panel 22.

Here it is not required that the material of the facade panel 21 arranged on the visible side corresponds with the material of the facade panel 22 arranged on the rear side.

In the general description it has been emphasized that after pouring the formwork space 17 the rear formwork panel 19 can also be completely removed so that the resulting facade panel 22 can be eliminated.

However, in the simpler embodiment shown in FIG. 8 it is assumed that the visible, as well as the rear facade panel 21, 22 are available, resulting in the multilayer composite body shown in FIG. 8.

In FIG. 9, a side view diagram of said multilayer composite body is shown, where it can be observed that a first layer 28 of the fast curing casting compound 26 connects to the rear side of the visible facade panel 21, which is also the formwork panel 18.

This layer 28 forms a close bond with the front side of the insulating body 16, and at the rear side of said insulting body 16 the second layer 29 of the curable, mechanically highly resilient casting compound 26 has been injected and molded, and to its rear side the rear facade panel 22 is attached as permanent formwork panel 19.

As indicated already in the general description, it is not required that the facade component 30 shown here consists of the layers 28, 16, 29. The layer 28 can be eliminated, and the visible facade panel 21 can be directly attached to the front side of the insulating body 16.

In a different embodiment provision can be made that the rear layer 29 is eliminated and the rear facade panel 22—provided it is available—is directly attached to the rear side of the insulating body 16.

FIG. 9 shows that one or several light sources 31 irradiate the rear side of the rear facade panel 22, whereby the light is absorbed by means of the front sides of the light conductor rods 1 engaging in the drill holes 23, directed via the longitudinal axis of the light conductor rods 1 in the direction of the arrows 32 through the facade component 30, making at the front side (visible side) the drill holes 23 arranged in the visible facade panel 21 shine, because there the ends of the light conductor rods 1 fill the drill holes 23 as form-fitting and flush as possible.

FIG. 10 shows that the front sides of each light conductor rod can be provided with stage approaches 33 which centrally engage in the drill holes 23, in order to allow for easy assembly of the light conductor rods when producing the according to FIG. 7.

The stage approach 33 forms rear stop edges 34 at the light conductor rod by means of which the light conductor rod rests against the rear side of the respective facade panel 21, 22.

It is also possible to design the heat insulating layer 35 in multipiece or multilayer fashion.

| Drawing legend | |
|---|---|
| 1 | light conductor rod |
| 2 | upper end |
| 3 | lower end |
| 4 | grid-bar mat |
| 5 | longitudinal rod |
| 6 | transversal rod |
| 7 | bundle |
| 8 | formwork panel |
| 9 | formwork panel |
| 10 | covering plate |
| 11 | drill hole |
| 12 | formwork space |
| 13 | filling device |
| 14 | direction of the arrow |
| 15 | insulating material |
| 16 | insulating body |
| 17 | formwork space |
| 18 | formwork panel |
| 19 | formwork panel |
| 20 | covering plate |
| 21 | facade plate |
| 22 | facade plate |
| 23 | drill hole |
| 24 | filling device |
| 25 | direction of the arrow |
| 26 | casting compound |
| 27 | direction of the arrow |
| 28 | layer (from 26) |
| 29 | layer (from 26) |
| 30 | facade component |
| 31 | light source |
| 32 | direction of the arrow |
| 33 | stage approach |
| 34 | stop edge |
| 35 | layer (from 16) |

The invention claimed is:

1. A method for producing a heat insulating, light conducting multilayer composite construction element for facades, in which the multilayer composite construction element comprises at least one layer of a curable casting compound and at least one heat insulating layer of insulating material, and all layers are penetrated by a plurality of light conducting elements, the method comprising the steps of:
   a.) fixing the light conducting elements in an insulating body forming the heat insulating layer,
   b.) inserting the light conducting elements fixed in the insulating body in a formwork space of a formwork formed by a plurality of formwork panels, the plurality of formwork panels comprising a plurality of permanent formwork elements comprising facade panels having a plurality of recesses, said inserting step comprising the step of inserting the light conducting elements into the recesses of the facade panels, and
   c.) filling the formwork space with a curable casting compound, forming at least one support layer.

2. The method according to claim 1, wherein said step of:
   a.) fixing the light conducting elements in an insulating body forming the heat insulating layer comprises the steps of:
   a1.) inserting the light conducting elements in holes of a plurality of insulating body forming formwork panels positioned opposite of each other and forming a formwork space;
   a2.) filling the formwork space with a heat insulating, curable insulating material; and
   a3.) removing the formwork panels after the insulating material is cured.

3. The method according to claim 1, wherein said step of c.) filling the formwork space with a curable casting compound comprises the steps of: securing the light conducting elements fixed in the insulating body during the process of filling the formwork space with the casting material by fixing the ends of the formwork panels, comprising facade panels against the displacement pressure of the curable casting compound.

4. The method according to claim 2, wherein said step of c.) filling the formwork space with a curable casting compound comprises the steps of: securing the light conducting elements fixed in the insulating body during the process of filling the formwork space with the casting material by fixing the ends of the formwork panels, comprising facade panels against the displacement pressure of the casting compound.

5. The method according to claim 1, wherein the light conducting elements comprise one of a plurality of light conductor rods and a plurality of light conductor discs.

6. The method according to claim 1, wherein each of the plurality of light conducting elements comprises at a front side a stage approach that is adjusted to a cross section of one of the plurality of recesses in the facade panels.

7. The method according to claim 1, wherein each of the formwork elements comprising facade panels comprises an anchoring element by means of which the multilayer composite construction can be anchored to an adjacent layer.

8. The method according to claim 2, wherein the light conducting elements comprise one of a plurality of light conductor rods and a plurality of light conductor discs.

9. The method according to claim 3, wherein the light conducting elements comprise one of a plurality of light conductor rods and a plurality of light conductor discs.

10. The method according to claim 2, wherein each of the plurality of light conducting elements comprises at a front side a stage approach that is adjusted to a cross section of one of the plurality of recesses in the facade panels.

11. The method according to claim 3, wherein each of the plurality of light conducting elements comprises at a front side a stage approach that is adjusted to a cross section of one of the plurality of recesses in the facade panels.

12. The method according to claim 4, wherein each of the plurality of light conducting elements comprises at a front side a stage approach that is adjusted to a cross section of one of the plurality of recesses in the facade panels.

13. The method according to claim 2, wherein each of the formwork elements comprising facade panels comprises an anchoring element by means of which the multilayer composite construction can be anchored to an adjacent layer.

14. The method according to claim 3, wherein each of the formwork elements comprising facade panels comprises an anchoring element by means of which the multilayer composite construction can be anchored to an adjacent layer.

15. The method according to claim 5, wherein each of the formwork elements comprising facade panels comprises an anchoring element by means of which the multilayer composite construction can be anchored to an adjacent layer.

16. The method according to claim 6, wherein each of the formwork elements comprising facade panels comprises an anchoring element by means of which the multilayer composite construction can be anchored to an adjacent layer.

17. The method according to claim 1, wherein the step of fixing the light conducting elements in an insulating body forming a heat insulating layer comprises the step of curing a heat insulating, curable insulating material about the light conducting elements.

* * * * *